F. B. LONG.
ARTICULATOR FOR PHONOGRAPHS.
APPLICATION FILED SEPT. 29, 1919.

1,352,291.

Patented Sept. 7, 1920.

WITNESSES

INVENTOR
FRANK BENAJAH LONG,
BY
ATTORNEYS

UNITED STATES PATENT OFFICE.

FRANK BENAJAH LONG, OF SACRAMENTO, CALIFORNIA.

ARTICULATOR FOR PHONOGRAPHS.

1,352,291.    Specification of Letters Patent.    Patented Sept. 7, 1920.

Application filed September 29, 1919. Serial No. 327,307.

*To all whom it may concern:*

Be it known that I, FRANK BENAJAH LONG, a citizen of the United States, and a resident of Sacramento, in the county of Sacramento and State of California, have invented a new and Improved Articulator for Phonographs, of which the following is a full, clear, and exact description.

The object of the invention is to provide certain new and useful improvements in sound recording and sound reproducing machines whereby the tone is amplified and distinctive enunciation is produced.

Another object is to provide the sound chamber of the phonograph into a sound board of a highly vibrant material and subjected to edgewise pressure to form a crown on the sound board with a view to insure perfect vibration.

Another object is to throw back upon the sound board the molecular vibrations emanating from the sound board.

With these and other objects in view, the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1:
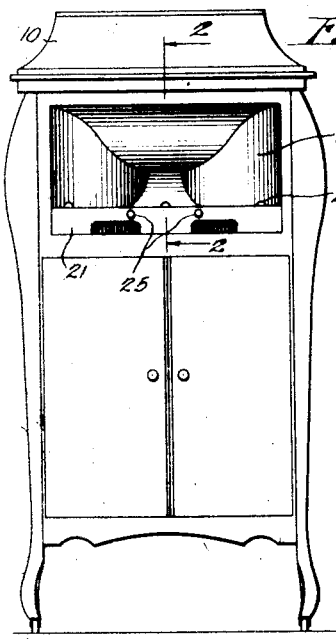
Figure 1 is a front elevation of the improved sound reproducing machine.
Figure 2:
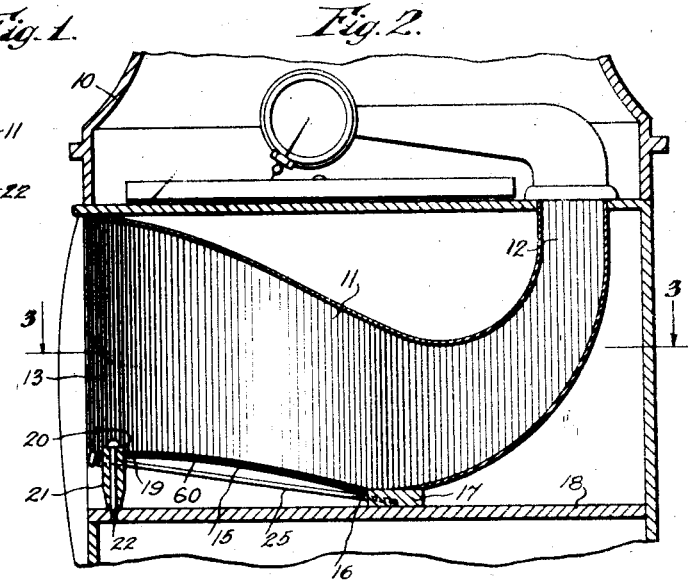
Fig. 2 is an enlarged front elevation of the sound chamber.
Figure 3:
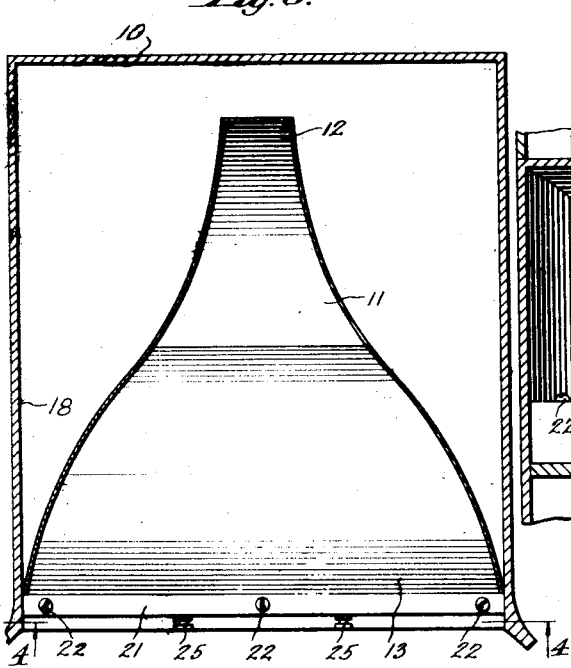
Fig. 3 is a cross section of the same on the line 3—3 of Fig. 2.
Figure 4:
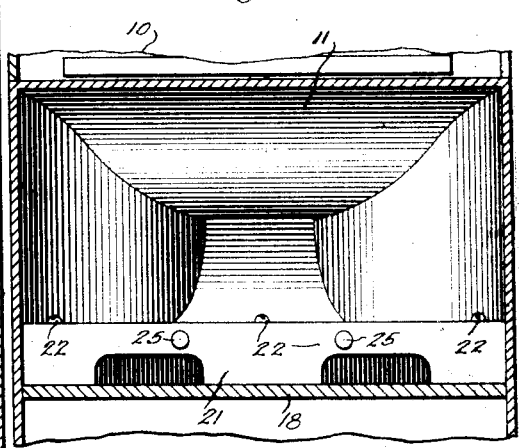
Fig. 4 is a sectional plan view of the same on the line 4—4 of Fig. 3.

The phonograph 10, shown in outline in Fig. 1, is, in its sound reproducing means, of the usual construction, and this machine is provided with a sound chamber 11 gradually increasing in size from its entrance end or throat 12 to the outlet or mouth 13. Any desired shape may be given to this sound chamber and a portion of, at least, one of the walls of this sound chamber is in the form of a sound board 15 which preferably forms the front bottom portion of the sound chamber. The rear edge 16 of the sound board 15 abuts against a block 17 fixed to the framework 18 of the sound chamber, and the forward edge 19 of the sound board 15 engages a groove 20 formed in a bridge 21 attached by a screw or other fastening means 22 to the framework 18. Screw rods 25 engage the bridge 21 and screw in the block 17 to exert a rearward pressure on the bridge 21 and hence an edgewise pressure against the sound board 15 to form a crown thereon, as plainly indicated in Figs. 2, 3 and 5. The sound board 15 is preferably made of spruce or other highly vibrant material, and the sound board is preferably provided with a rim of a harder material than that of which the sound board is made with a view to throw molecular vibrations emanating from the sound board back onto the same.

Figure 5:
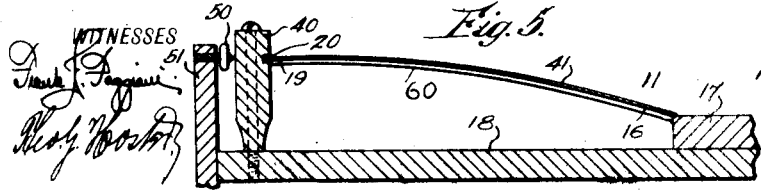
Fig. 5 is a cross section of a modified form of the same.

In the modified form shown in Fig. 5 the bridge 40 used for exerting edgewise pressure on the sound board 41 is engaged by pressure screws 50 screwing in a post 51 forming part of the framework of the machine. It is understood that the pressure screws 50 are used for giving a crown to the sound board 41. It is understood also that different degrees of pressure may be exerted edgewise against the sound board to give the desired crown to the same to amplify the tone and increase the distinctness of the enunciation.

Although the sound board 15 is described and shown as part of one of the walls of the sound chamber 11, I do not limit myself to this construction as the sound board may be arranged within the sound chamber 11. The sound board is preferably provided at the under side with ribs 60 to reinforce the sound board and to distribute the vibrations equally.

Having thus described my invention, I claim as new and desire to secure by Letters Patent:—

1. In a sound recording or sound reproducing machine a sound chamber provided with a sound board, and means for exerting an edgewise pressure on the said sound board to form a crown thereon.

2. In a sound recording or sound reproducing machine, a sound chamber for the passage of the sounds to be recorded or reproduced, at least one of the walls of the chamber forming a sound board, and means to exert a pressure edgewise on the said sound board.

3. In a sound recording or sound reproducing machine, a sound chamber provided with a sound board of a highly vibrant material, and tensioning means exerted edgewise on the said board to form a crown thereon.

4. In a sound recording or sound reproducing machine, a sound chamber provided with a sound board of a highly vibrant material and having a rim of a harder material than that of which the sound board is made, and tensioning means exerted edgewise on the said board to form a crown thereon.

5. In a sound recording and sound reproducing machine, a sound chamber gradually increasing in size from its throat to its mouth, a portion of one of the walls of the said sound chamber forming a sound board, and means exerted edgewise on the said sound board to form a crown on the same.

6. In a sound recording and sound reproducing machine, a sound chamber gradually increasing in size from its throat to its mouth, a portion of one of the walls of the said sound chamber forming a sound board, a block against which abuts one side edge of the said sound board, a bridge engaged by an opposite edge of the sound board, and pressure means exerted on the said bridge to form a crown on the said sound board.

7. In a sound recording and sound reproducing machine, a sound chamber gradually increasing in size from its throat to its mouth, a portion of one of the walls of the said sound chamber forming a sound board, a block against which abuts one side edge of the said sound board, a bridge engaged by an opposite edge of the sound board, and screw rods screwing in the said block and engaging the said bridge to exert a pressure edgewise on the said sound board to form a crown thereon.

8. In a sound recording and reproducing mechanism, a sound chamber, a sound board in one of the walls of the chamber, said sound board having on its under side longitudinally extending ribs, and means for applying pressure to one edge of the board to buckle the same.

FRANK BENAJAH LONG.